United States Patent
Adler et al.

(10) Patent No.: US 10,223,092 B2
(45) Date of Patent: Mar. 5, 2019

(54) CAPTURING AND DEPLOYING APPLICATIONS USING MAXIMAL AND MINIMAL SETS

(71) Applicant: VMware, Inc., Palo Alto, CA (US)

(72) Inventors: Nir Adler, Netanya (IL); Dima Golbert, Beit Shemesh (IL); Avshi Avital, Sde Warburg (IL); Or Lupovitz, Rishon le Zion (IL); Kosta Shougaev, Rehovot (IL)

(73) Assignee: VMware, Inc., Palo Alto, CA (US)

( * ) Notice: Subject to any disclaimer, the term of this patent is extended or adjusted under 35 U.S.C. 154(b) by 57 days.

(21) Appl. No.: 15/178,540

(22) Filed: Jun. 9, 2016

(65) Prior Publication Data

US 2017/0357492 A1 Dec. 14, 2017

(51) Int. Cl.
*G06F 9/445* (2018.01)
*G06F 8/60* (2018.01)
*H04L 29/08* (2006.01)
*G06F 8/61* (2018.01)

(52) U.S. Cl.
CPC .................. *G06F 8/60* (2013.01); *G06F 8/62* (2013.01); *H04L 67/34* (2013.01)

(58) Field of Classification Search
CPC ........................................................ G06F 8/60
See application file for complete search history.

(56) References Cited

U.S. PATENT DOCUMENTS

| 2002/0161908 | A1* | 10/2002 | Benitez ............... G06F 8/65 709/231 |
| 2008/0307414 | A1* | 12/2008 | Alpern ............... G06F 9/45558 718/1 |
| 2012/0278439 | A1* | 11/2012 | Ahiska ............... H04L 67/2852 709/218 |
| 2016/0088118 | A1* | 3/2016 | Sivasubramanian ........ H04L 67/2842 709/219 |

* cited by examiner

*Primary Examiner* — Hang Pan

(57) ABSTRACT

Systems and methods are described for packaging and deploying applications using minimal and maximal component sets. A minimal set of application components that includes at least the necessary components for launching the application is first downloaded to an endpoint device from a central server. The application is launched on the endpoint from the minimal set. If the application requests a missing component that is not available on the endpoint, the missing component is requested and delivered on-demand from a maximal set located on the server, where the maximal set contains all possible application components. The application is suspended during the download of the missing component. After the missing component is downloaded, the application is resumed, having access to the missing component on the endpoint.

20 Claims, 5 Drawing Sheets

CAPTURING AND DEPLOYING APPLICATIONS USING MAXIMAL AND MINIMAL SETS

TECHNICAL FIELD

The present disclosure generally relates to application packaging and application management and more particularly relates to using a minimal set and a maximal set to capture and deploy applications.

BACKGROUND

Information Technology (IT) management has become an increasingly complex task for a large organization. There may be thousands of users (e.g. employees) carrying their own individual endpoint devices (e.g. laptops, workstations, smart phones, tablet computers, etc.) and each device may have an abundance of software and applications that are operating on the device. Some of these applications are unique to each individual user, while others are identical across several devices or at least share some of the same components (e.g. files, registry entries, data). Users generally want the freedom to install whatever software and applications they choose while IT departments are faced with the need to maintain compliance and data protection across this complex ecosystem. For example, a typical IT department today needs to be able to manage, secure and deliver applications to users, distribute software updates, as well as be able to back up and restore any user's data and settings on demand.

One requirement for managing applications on such a large scale is being able to produce an application package that can be distributed from a central location to a large number of endpoint devices, where the package can be deployed and executed. There exist a number of software solutions, sometimes referred to as "application capture" systems that attempt to aid organizations in creating such packages. For example, the System Center Configuration Manager (SCCM) available from Microsoft Corporation; the LANDESK Management Suite (LDMS) available from LANDESK Software; and the Client Management Suite (CMS) available from Symantec Corporation; all take different approaches in assisting an IT administrator in application management, including in some cases capturing an application package that could be delivered to end user devices.

Conventional solutions for the capture, delivery and management of applications often leverage recording technologies during the application installation. This generally means that each application must first be installed separately on a dedicated clean staging machine, which could be a virtual machine or a physical computer. For example, one type of process for capturing an application first records the state of the system on the staging machine prior to installing an application (i.e. captures a pre-installation snapshot) and then records the state of the system again after the application has been installed (i.e. captures a post-installation snapshot). Based on a comparison of the pre-installation snapshot and post-installation snapshot, the system is able to compute a delta that indicates which files and registry entries were added, removed, and modified during the installation process. This delta can presumably then be used to determine which components (files, registry entries, etc.) actually comprise the application so that a package containing those components can be created and delivered to multiple endpoint devices.

However, the type of process mentioned above suffers from a number of shortcomings, including the possibility of missing some necessary components of an application. In some situations, the application installation process may require certain files which were already present on the device before the installation and, as such, the installation process might not actually affect those files. In such cases, the pre-installation/post-installation comparison would not indicate that these files were modified by the installation process and, consequently, those files would not be included in the application package. One simple example of such a situation occurs when the capture process attempts to install Microsoft Visio application on a staging machine that already has Microsoft Office preinstalled thereon. Since Microsoft Office contains many of the files that are necessary for Visio, merely looking at the post-installation changes on that machine would not yield all of the required components of Visio. Therefore, when such a package is delivered to another machine (which does not have Microsoft Office preinstalled thereon) the application would not function properly. Additionally, conventional application captures may also be vulnerable to capturing "noise" along with the target files. For example, between the time of pre-installation snapshot and post-installation snapshot, another application may have updated itself, an operating system update may have applied, or another change taken place. The change may have added or modified certain files which are actually unrelated to the application installation, but these changes would be included in the captured package. Including such noise in the application package may cause problems when delivering the package to other machines. Yet another limitation of conventional application capture process described above is that it requires a recording of the pre-installation state, which is not always available in the first place; for example, in the case of legacy applications.

It should be noted that the process described above is just one example of an application capture and not all of its shortcomings may be applicable to all such systems. However, most conventional application capture systems still suffer from at least one form of inefficiency or another. Generally speaking, the inherent difficulty in trying to create an application package using conventional capture systems stems from the large numbers of users, devices and types of software that are involved. Organizations may reach inventories with thousands or even tens of thousands of applications, each of which requires a significant investment in time and resources to capture. Many organizations are intimidated by the amount of work and resources they will need to invest in order to start managing the applications. At the same time, those that are willing to perform all the required manual work to capture applications soon find out that this is an on-going, never-ending process, since for every new version of an application the administrator needs to re-capture the application and repeat the process. Additionally, many conventional application capture systems suffer from incomplete captures and noise during the capture process mentioned above. All of these vulnerabilities cause malfunctions as well as incorrect and unexpected behavior when trying to use the captured application on the endpoint devices. This represents an additional pain point for the organization—testing that the application capture was indeed successful and will work as expected on the end user's actual environment. In light of all of these shortcomings, a more efficient system for capturing and managing applications is needed.

DETAILED DESCRIPTION

Figure 1:
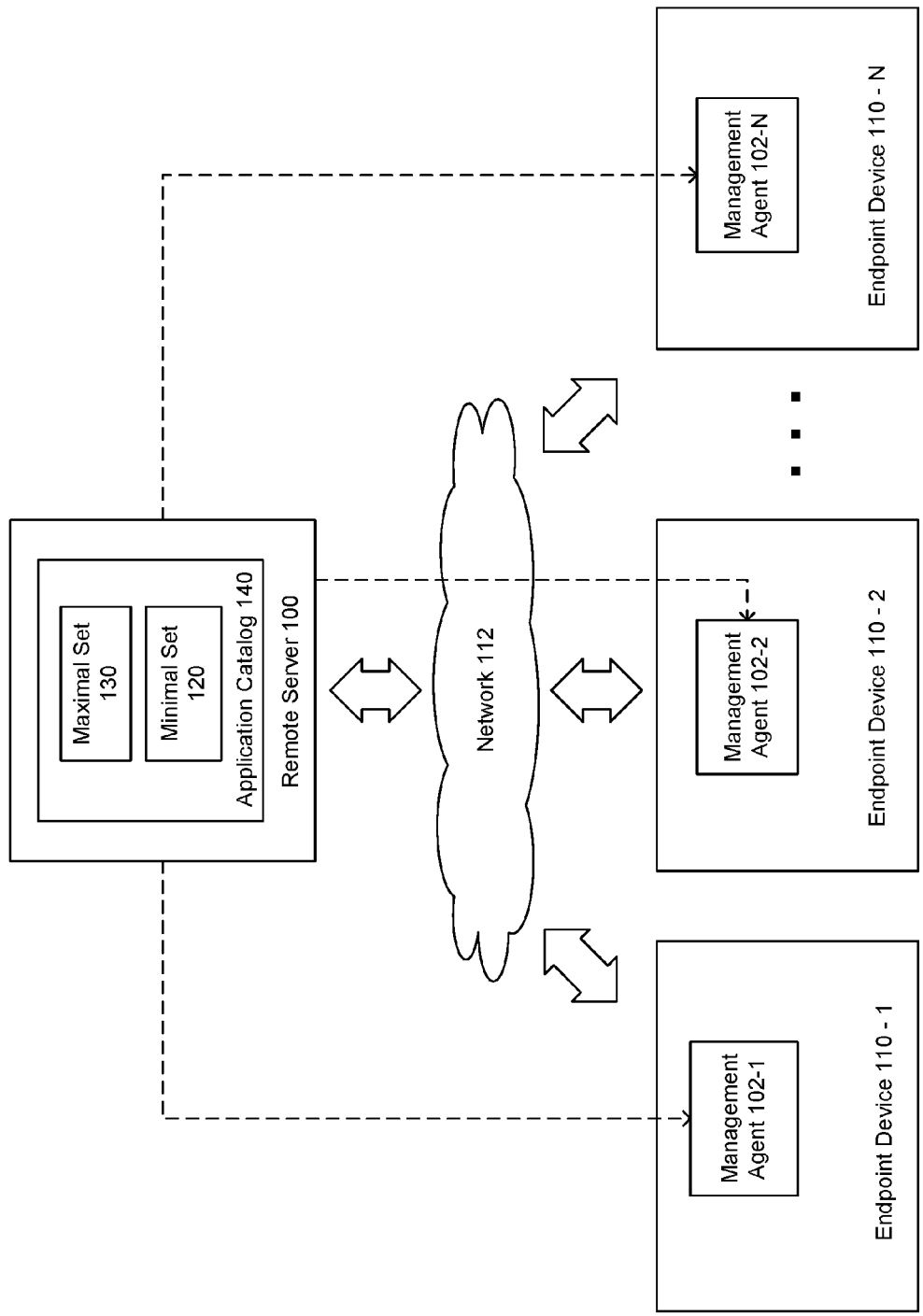
FIG. 1 illustrates an example of a system for managing applications on endpoint devices using a minimal and a maximal set, in accordance with various embodiments.

Systems and methods in accordance with various embodiments of the present disclosure overcome at least some of the above mentioned shortcomings and deficiencies by providing an improved mechanism for capturing applications and creating and distributing application packages that can be executed and managed on endpoint devices. While conventional application capture systems generally take an approach where final application packages are produced in a staging environment and then delivered to end user devices from a central location, the embodiments described herein enable an approach where a minimal set of application components that are necessary for launching the application is first delivered to the endpoint device, the application is launched on the endpoint device using the minimal set, and additional components are delivered on-demand from a maximal set remotely located at a central location as the application executes on the endpoint.

In various embodiments, the minimal set of application components contains at least the components necessary for a user of the endpoint to be able to launch the application (but may contain additional components as well). However, in some cases, the minimal set may be missing various other required components that may be needed by the application during execution. The minimal set includes the components capable of being distributed to an endpoint device that have been previously determined to enable the device to launch the application. This minimal set may be based on the assumption that the endpoint device already has a number of components stored on it which are not included in the minimal set (e.g., various operating system files, etc.) even though they are required by the application and as such, those components do not need to be delivered to the endpoint device during the initial application distribution. After the minimal set is downloaded to the endpoint and the application is launched from the minimal set, if a missing application component (i.e., a component of the application that is not available on the endpoint but is available in a maximal set of application components located at a central location) is required by the application, the application can be suspended while the missing component is retrieved from the maximal set. After the missing component is downloaded to the endpoint, the application can be resumed, now having access to the missing component.

Generally, the maximal set is an over-inclusive set of data that contains all possible application components and may contain data unrelated to the application. For example, the maximal set may include a full or substantially full copy of the disk contents of a computing device on which a full installation of the application was previously performed. Hence, the maximal set may include a full and complete set of all components that could possibly be requested by the application under any condition.

As the application continues to execute, any further application components required by the application that are not part of the minimal set can likewise be retrieved from the maximal set. If the system determines that any missing component that is retrieved from the maximal set should be made a permanent part of the minimal set, the minimal set can be amended by adding the missing component. Accordingly, in future deployments of the application to other endpoint devices, the minimal set will include such a missing component. The minimal set builds and evolves over time as additional components are added. Eventually, the minimal set may contain a complete set of application components and further downloads of missing components from the maximal set may not be necessary or be substantially less likely.

By retrieving components from the maximal set as they are requested by the application, the system is able to identify and retrieve required components of the application on-demand, which may have the added benefit of avoiding or limiting the downloading of unnecessary data or noise to the endpoint that can occur with traditional application capture technologies. Because all application components don't need to be included in the minimal set, the challenge of identifying every single application component, which is a challenge inherent in traditional application capture techniques, is avoided. As components that are missing in the minimal set are identified, the minimal set may be amended by adding such missing components so that, over time, few (if any) missing components need to be downloaded from the maximal set after the minimal set is downloaded to an endpoint. Moreover, the entire process can be performed without administrator oversight or involvement.

In various embodiments, several steps of the process are performed by an application management agent that operates transparently in the background on each endpoint computing device that needs to be managed. When an installation of an application is initiated, the agent downloads the minimal set of components corresponding to the application to the endpoint. The agent also downloads a manifest identifying components that are available in the maximal set corresponding to the application located at the central location (e.g., on a central server). The application is then launched and runs from the minimal set on the endpoint.

During execution, if the application attempts to access a component that is not available on the endpoint, the agent checks the manifest to see if the component is available in the maximal set on the server. If the agent determines that the component is available in the maximal set on the server, the agent requests and downloads the component from the server. While the component is downloaded, the application can be suspended. Once the component download is finished, the application is resumed and can access the downloaded component on the endpoint. Similarly, if further missing components are required by the application and are not available on the endpoint, the agent can check the manifest and, if a missing component is available in the maximal set, the agent can download the missing component while the application is suspended.

FIG. 1 illustrates an example of a system for managing applications on endpoint devices using a minimal and a maximal set, in accordance with various embodiments. As illustrated, a remote server 100 is connected via a network 112 to a plurality of client or endpoint devices 110-1, 110-2, 110-N to perform certain management functions on the plurality of endpoint devices, such as installing applications. For example, the remote server 100 could be a central management server in an enterprise that is used by an information technology (IT) department to manage endpoint client devices (e.g., 110-1, 110-2, 110-N) on the enterprise network 112. As user herein, the terms "client device", "endpoint device", or "end user device" are interchangeable.

A management agent 102-1, 102-2, 102-N can be downloaded and installed on each endpoint device 110-1, 110-2, 110-N that is to be managed. In one embodiment, the agent 102-1, 102-2, 102-N can be downloaded from the remote server 100. The server 100 includes an application catalog 140 containing a minimal set 120 and a maximal set 130 corresponding to an application. While a minimal set 120 and a maximal set 130 for only one application are illustrated, in a real world scenario, the catalog 140 may contain minimal and maximal sets for numerous applications. As will be described in further details below, the minimal set 120 and maximal set 130 can be used by the system to deploy the corresponding application on a computing device (e.g., 110-1, 110-2, 110-N). For example, an information technology (IT) administrator can have access to the application catalog 140 via a user interface, such as a display, and select an application from the catalog 140 to be deployed to one or more endpoints (e.g., 110-1, 110-2, 110-N). The selected application may then be deployed by the system to the selected endpoints using the minimal set 120 and the maximal set 130, as will be described in further detail below.

In various embodiments, the minimal set 120 comprises necessary application components for launching the application on the client device. For example, the minimal set 120 may contain the required components in order for a user of an endpoint (e.g., 110-1, 110-2, 110-N) to be able to launch the application on the endpoint (e.g., 110-1, 110-2, 110-N) while other components, which may be required by the application after the application starts running, might be missing from the minimal set 120. In an embodiment, the minimal set 120 may comprise a minimal set of files that are required for an initial application launch. Hence, the minimal set 120 may be based on the assumption that the device already has many of the required components (e.g., various OS files) that are required by the application but do not need to be distributed since they are already resident on the device. As user herein, the term "component" refers to any applicable part of an application, such as a file, a module, a registry entry, a set of data, another application, and so on.

Various application capture tools may be used to produce the minimal set 120 and the invention is not limited to any particular tool. For example, the minimal set 120 may comprise an application package that is captured using any of a variety of existing or commercially available tools designed for capturing application packages. Such tools often operate by installing the application on a target computing device and comparing the pre-installation state of the machine with the post installation state to determine the changes or the "delta" that was created on the computing device by installation of the application. The application package, or the minimal set 120, can then be produced based on the delta.

Thus, in an embodiment, the minimal set 120 can be captured from an endpoint, such as 110-1, via the agent on the endpoint 102-1, using a capture tool. The captured minimal set 120 can subsequently be conveyed to the server 100. For example, the IT administrator can elect to capture the minimal set 120 for the application from the endpoint 110-1. Subsequently, the application can be installed on the endpoint 110-1 (e.g., using a traditional installer) and the minimal set 120 can be determined. In an embodiment, the minimal set 110-1 can be determined by comparing the pre-installation state of the endpoint 110-1 (such as a snapshot of the endpoint 110-1 immediately before the installation) with a post-installation state of the endpoint 110-1 (such as a snapshot of the endpoint 110-1 immediately after the installation). Based on a comparison of the pre-installation snapshot and post-installation snapshot, the system is able to compute a delta that indicates which files and registry entries were added, removed, and modified during the installation process. This delta can then be used to determine which components (files, registry entries, etc.) actually comprise the application so that a package (the minimal set) containing those components can be created.

In another embodiment, the minimal set 120 can be determined by identifying a set of files that are required for the initial application launch; for example, the application can be launched on an endpoint (e.g., 110-1) and the endpoint can be monitored to determine which components the application accesses. Consequently, the accessed components can be labeled as the minimal set 120.

Notably, while existing application capture systems, in general, must capture every component of an application for the application to function correctly when installed, the minimal set 120 does not need to contain all application components. Indeed, the minimal set 120 only needs to contain enough components for the application to be able to launch on an endpoint (e.g., 110-1, 110-2, 110-N) because any other needed components are available for download from the maximal set 130 if requested by the application while running. This way, even if the minimal set 120 does not contain all of the necessary components, the application can still function. This approach also avoids the need to transfer large amounts of data to the endpoint device 110-1 while still guaranteeing that the application will be able to execute.

Hence, simpler or less thorough methods can be used for capturing the minimal set 120 than are generally used for capturing application packages in other technologies because not all application components have to be captured in the minimal set 120. Further, by focusing on capturing only necessary components for launching the application in the minimal set 120, the invention also has the advantage of reducing the risks of including undesired elements, such as unrelated data or noise, that is often captured using traditional application capture systems.

Thus, the minimal set 120 can be captured using any methods that determine the necessary components for launching the application. Such methods include monitoring a computing device when the application is launched to determine what files are accessed by the application. For example, the application may be executed in an isolated or "sandboxed" environment such that all accesses made by the application to components may be monitored to determine the minimal set 120.

In other embodiments, the components of the minimal set 120 may be determined heuristically by analyzing the application code. For example, this may be performed by analyzing the main executable files of the application to determine what components are called by the main executable files. The identified components may then be further analyzed to determine what components are called by the identified components, and so on. Such a heuristic analysis may be performed statically, i.e., by having the system analyze the code of the application on a device containing the application, without actually running the application.

In various embodiments, the maximal set 130 is a set of data that is assumed to include all components that can possibly be required by the application. In general, the maximal set 130 may include ample information that is not part of, and is not related to, the application. Namely, because the maximal set 130 is located on the server and is accessed to retrieve application components as they are requested by the application during execution, the maximal set 130 can be over-inclusive, in the sense that there is no significant detriment if the set 130 contains unnecessary information as long as it also includes all components of the application. Further, because the maximal 130 set is located on the server 100 and is never entirely downloaded to an endpoint, space consumed by the maximal set 130 may not be a significant concern.

In an embodiment, the maximal set 130 can comprise the entire disk contents of a computing device on which the application has been previously installed. For example, the maximal set 130 can be produced by locating an endpoint (e.g., 110-1, 110-2, 110-N) on which the application has been installed and uploading the entire disk contents of the endpoint to the server 100, such that the uploaded content will comprise the maximal set 130.

In another embodiment, the maximal set 130 can comprise a portion of the disk contents of a computing device on which the application has been previously installed. For example, the maximal set 130 can be produced by locating an endpoint (e.g., 110-1, 110-2, 110-N) on which the application has been installed and uploading portions of the disk contents of the endpoint to the server 100 according to a predefined policy, such that the uploaded content will comprise the maximal set 130. For example, such a policy can define which portions or areas of an endpoint's contents should be uploaded to the server 100 and be included in the maximal set 130 (because such portions or areas are deemed to be possible locations of the application's components). The policy can further define which portions of the endpoint's contents should be excluded, i.e., not be uploaded (because such portions or areas are not deemed possible locations of the application's components). In other embodiments, the policy can simply define which portions of the endpoint's contents should be excluded while all other areas are uploaded. For example, areas which might generally be excluded include system files that are not related to the application, recycle files, temporary files, and so on.

In an embodiment, the maximal set 130 can be retrieved from the same device from which the minimal set 120 was captured. In some embodiments, the maximal set and/or the minimal set 120 can be captured from a different device or from a target computing device, i.e., a device set up for the specific purpose of capturing the maximal set 130, on which the application is preinstalled. In various embodiments, the minimal set 120 and maximal set 130 can be generated separately and simply downloaded to the server 100. Furthermore, a single maximal set 130 can serve as the maximal set 130 for various applications. For example, if the maximal set 130 was captured from an endpoint having several installed applications, then the maximal set 130 may be used for deploying any of the several installed applications to other endpoints, provided, of course, that a minimal set 120 is also available for each of the several applications.

For the sake of clarity, it should be noted that, in some parts this disclosure describes generating the minimal set 120 and/or maximal set 130 from an endpoint such as 110-1, 110-2, 110-N, and in other parts this disclosure describes deploying an application on an endpoint such as 110-1, 110-2, 110-N using the generated minimal set 120 and maximal set 130. To clarify, if the minimal set 120 and/or maximal set 130 are generated from a particular endpoint (e.g., 110-1, 110-2, 110-N), then the application is generally already present on the particular endpoint (unless it was deleted) and so the minimal set 120 and maximal set 130 would not be used to deploy the application on the particular endpoint again because it is already present.

Figure 2:
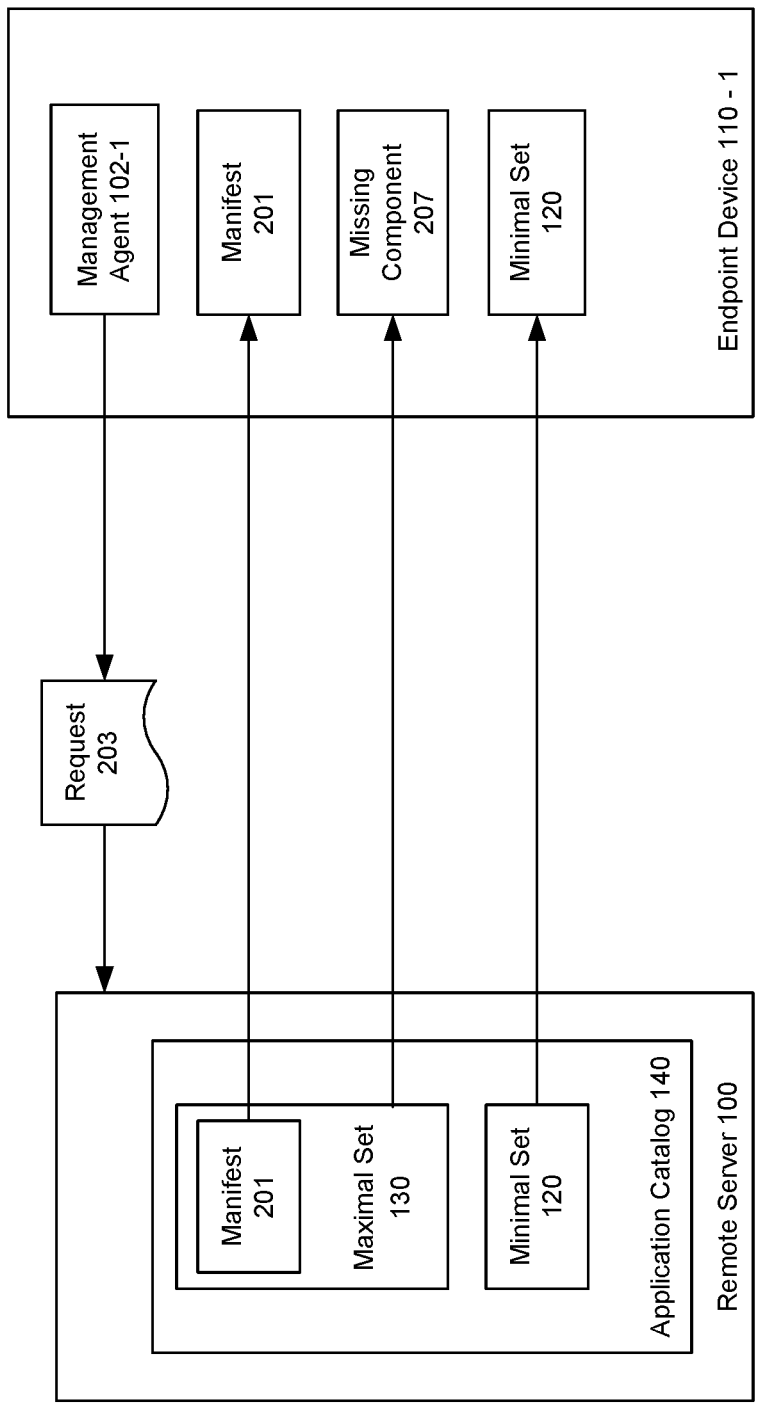
FIG. 2. illustrates an example diagram of an application being deployed on an endpoint using a maximal and a minimal set.

FIG. 2. illustrates an example diagram of an application being deployed on an endpoint using a maximal and a minimal set. As illustrated in the example of FIG. 2, a remote server 100 is in communication with an endpoint device 110-1. The remote server 100 and endpoint device 110-1 can be the server 100 and endpoint device 110-1 illustrated in FIG. 1. The process begins by downloading a minimal set 120 and a manifest 201 of the maximal set 130, both of which correspond to a certain application, to the endpoint 110-1. For example, an administrator may choose the application from a catalog of applications 140 on the server and assign the application to the endpoint 110-1 to install the application on the endpoint 110-1. Once the application is assigned, a management agent 102-1 operating on the endpoint downloads the minimal set 120 and the manifest 201 to the endpoint 110-1.

In various embodiments, the manifest 201 is a file identifying the components in the maximal set 130 to make it possible to determine whether a particular application component is available in the maximal set 130 without actually querying the maximal set 130 itself. For example, the manifest 201 can provide identifying information for each component in the maximal set 130. Then, to determine whether a particular missing component is available in the maximal set 130, identifying information for the particular missing component can be compared with the identifying information of each component in the manifest 201. If matching identifying information is located in the manifest, then the missing component can be assumed to be available in the maximal set 130. It should be noted that, while the preferred embodiment implements a manifest 201 to identify whether a component is available in the maximal set 130, other techniques can be used in other embodiments for performing this function, including querying the maximal set 130 directly.

After the minimal set 120 and the manifest 201 are downloaded, the application is launched on the endpoint 110-1 from the minimal set. For example, the application may be launched when a user opens the application on the endpoint 110-1 to use the application. When running, if the application attempts to access a component that is missing on the endpoint device 110-1, e.g., missing component 207, instead of failing the application, the application can be suspended or the return of the function can be temporarily blocked. For example, the same general mechanism in the operating system that is used to suspend applications during data retrieval can be used to suspend the application in this case.

While the application is suspended, the management agent 102-1 determines whether the component 207 is available in the maximal set 130 (e.g., by checking the manifest 201). If the agent 102-1 determines that the component is available in the maximal set 130, then the agent 102-1 can send a request 203 for the missing component to the server 100. Thereafter, the missing component 207 can be downloaded from the server 100 to the endpoint 110-1. The application continues to be suspended during the download of the missing component 207. Once the component 207 is downloaded, the pending request for the missing component 207 can be released and the application can continue to run having access to the missing component 207 on the endpoint 110-1.

If, on the other hand, the agent 102-1 is unable to locate the missing component 207 in the maximal set 130 (e.g., by checking the manifest 201 on the endpoint 110-1), then the system can generate an error message stating that the component does not exist. For instance, this may be the same error mechanism or return code that is generally implemented when there is a missing file on the machine.

As the application continues to execute, other application components may be requested by the application and, if any of the components are not available on the endpoint, the process can repeat by checking if each such missing component is available in the maximal set 130 and downloading the component to the endpoint 110-1, if it is available.

In various embodiments, the process can continue until it is determined that all components of the application are downloaded to the endpoint 110-1 or until a certain triggering event for terminating the process occurs. For example, the process can terminate when the system detects that the application has been executing for a predetermined amount of time, or when the system detects that the application has been executing for a predetermined amount of time without any new missing component being requested. Once the process terminates, the application can be executed on the endpoint 110-1 as a standard application, for example, without being monitored by the agent 102-1 or needing access to the maximal set 130.

As will be appreciated by those skilled in the art, different mechanisms can be used to perform corresponding functions of the agent 102-1. For example, to perform the functions associated with identifying when a component is missing, a mini filter driver can run on the endpoint 110-1 that monitors and receives all components that the application accesses. In an embodiment where the endpoint runs on a Microsoft Windows® operating system, the operating system allows a kernel driver to be run that monitors and receives all the files that the application requests. In these embodiments, this kernel driver can be implemented to perform corresponding functions of the agent 102-1.

In various embodiments, when a missing component (e.g., 207) is requested (e.g., 203) by an endpoint (e.g., 110-1), the minimal set 120 on the server 100 can be modified by adding the missing component 207 to the minimal set 120. This way, in a subsequent deployment, when the minimal set 120 is downloaded to a different endpoint to deliver the application, the minimal set 120 will already contain the missing component 207, thereby avoiding the need to download the missing component 207 from the server 100 separately while the application is suspended. Similarly, as other missing components of the application are identified and requested, those components can also be added to the minimal set 120. Accordingly, over time, the minimal set 120 can evolve to contain more and more components such that eventually, few; if any, missing components have to be downloaded separately from the server 100 to deploy the application on an endpoint.

In a preferred embodiment, the minimal set 120 on the server 100 is modified by adding the missing component (e.g., 207) only if the missing component is consistently requested by endpoints (e.g., 110-1, 110-2, 110-N) onto which the minimal set 120 has been deployed. Namely, to ensure that only components that are actually necessary for the application are added to the minimal set on the server, and not unnecessary components that might be requested due to error or otherwise, the system can be configured to require that a missing component is consistently requested or that several endpoints request the missing component, before the component is added to the minimal set on the server. For example, the system may deploy the minimal set 120 to a plurality of endpoints (e.g., 110-1, 110-2, 110-N) and keep count of how many times a particular missing component (e.g., 207) is requested by the endpoints (e.g., 110-1, 110-2, 110-N). Once the number of requests for the missing component surpasses a certain, predetermined threshold amount, the missing component 207 can be permanently added to the minimal set (e.g., 120) on the server. For example, if a cumulative number of requests for the missing component that are received from any client devices exceeds a predetermined threshold, then the minimal set 120 on the server 100 may be modified by adding the missing component to the minimal set 120 on the server 100.

Figure 3:
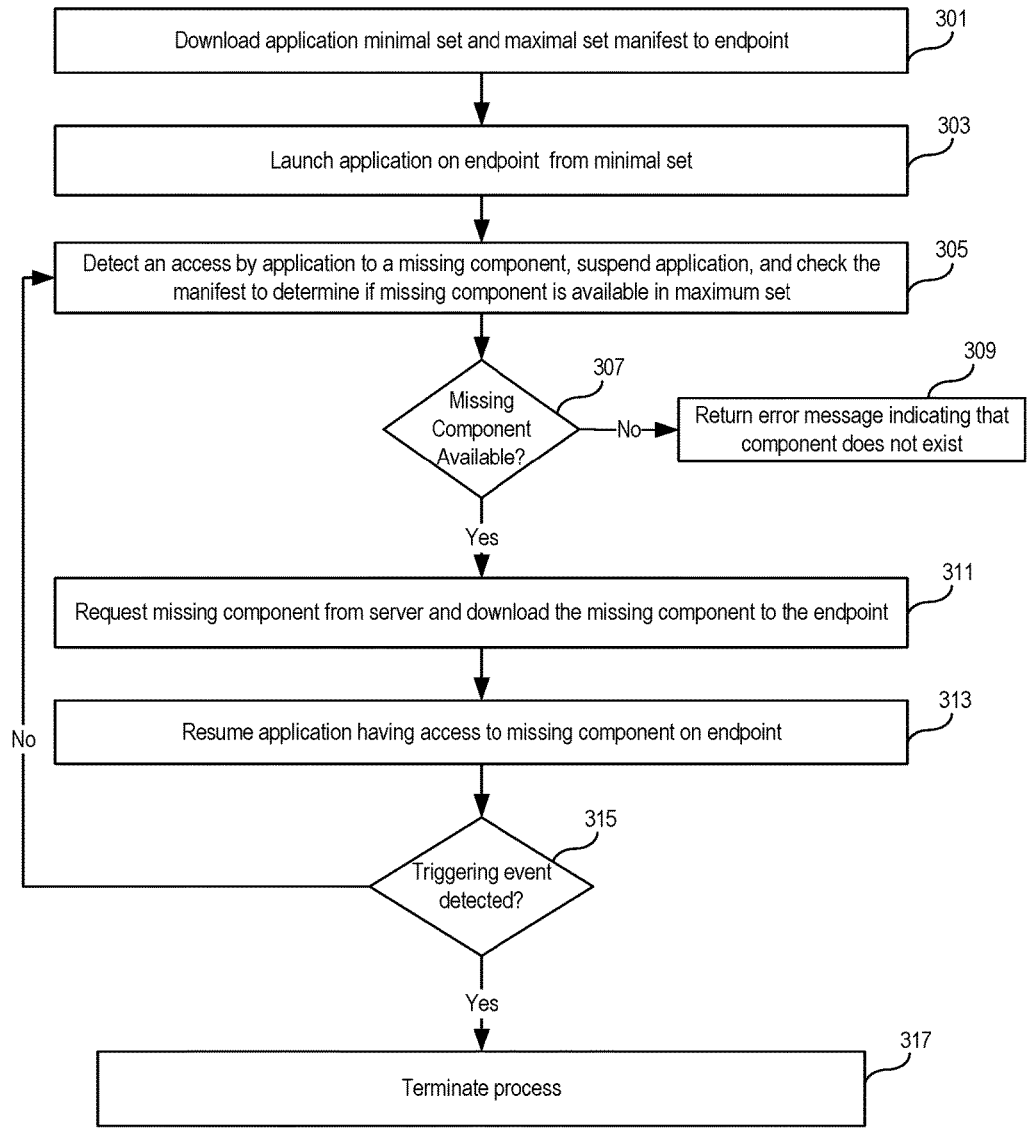
FIG. 3. Illustrates an example process for deploying an application on an endpoint using a maximal and a minimal set.

FIG. 3. Illustrates an example process for deploying an application on an endpoint using a maximal and a minimal set. In operation 301, a minimal set corresponding to the application and a manifest of a maximal set corresponding to the application are downloaded to the endpoint from a central server. The downloads may be performed by an agent running on the endpoint. In various embodiments, the minimal set comprises necessary application components for launching the application on the client device or endpoint and the manifest identifies components in the maximal set. As described above, in various embodiments, the maximal set may be created by capturing content from a computing device on which the application is preinstalled, according to a predefined policy.

In operation 303, the application is launched on the endpoint from the minimal set. For example, the application may be launched by a user of the client device opening the application to use it. In operation 305, an access by the application to a missing component is detected, the application is suspended, and a check is performed on the manifest to determine if the missing component is available in the maximal set. In various embodiments, an agent operating on the endpoint can detect the access to the missing component and perform the check for the missing component in the manifest.

In operation 307, the logic determines if the missing component is available in the maximal set based on the manifest. If the component is not available, then the logic returns an error message indicating that the component does not exist, in operation 309. If the logic determines that the missing component is available in the maximal set based on the manifest, then, in operation 311, a request for the missing component is sent to the server and the missing component is downloaded to the endpoint. For example, the request may be sent by an agent operating on the endpoint. After the missing component is downloaded, in operation 313, the application can resume executing, now having access to the missing component on the endpoint.

In decision 315, the logic determines whether a triggering event for terminating the process has been detected. For example, a triggering event may be that the application has executed for a predetermined amount of time, or that the application has executed without requesting a missing component for a predetermined amount of time. If a triggering event has not been detected, then the logic can return to operation 305, by detecting a next missing component, etc. If a triggering event is detected, then the process can terminate in operation 317 and the application can thereafter execute in a standard mode, e.g., without using an agent, maximal set, etc.

Figure 4:
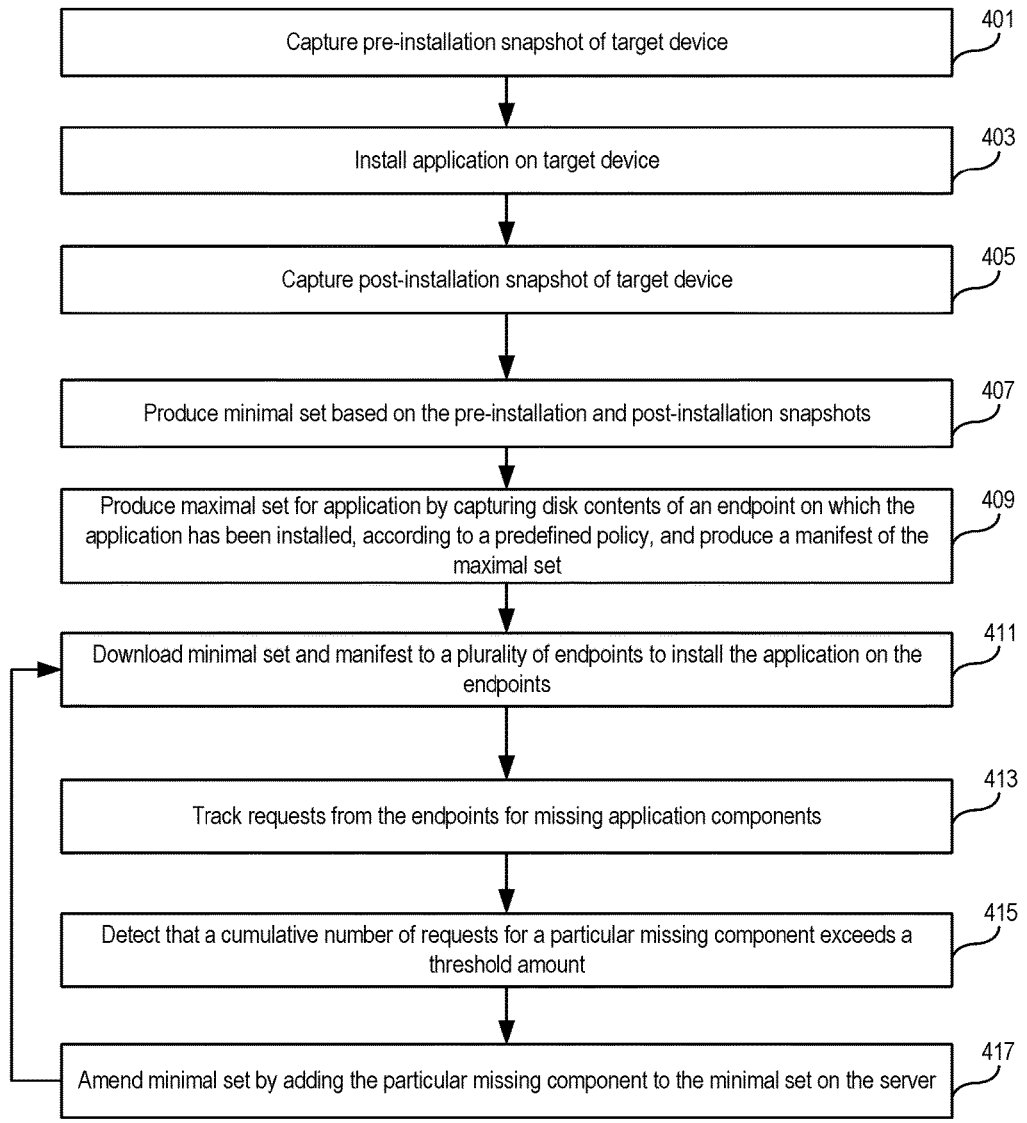
FIG. 4 illustrates an example process for generating the minimal and maximal sets on the server and updating the minimal set.

FIG. 4 illustrates an example process for generating the minimal and maximal sets on the server and updating the minimal set. In operation 401, a pre-installation snapshot is captured from a target device. In an embodiment, the target device can be an endpoint that is connected to the server over a network, from which the minimal set will be captured. In operation 403, the application is installed on the target device. In operation 405, a post-installation snapshot of the target device is captured. In operation 407, a minimal set is produced for the application based on the pre-installation and the post-installation snapshots. For example, the minimal set can be produced based on the differences between the pre-installation and the post-installation snapshots.

In operation 409, a maximal set for the application is produced by capturing disk contents of an endpoint on which the application has been installed, according to a predefined policy, and a manifest of the maximal set is subsequently produced. In an embodiment, the endpoint can be the same computing device from which the minimal set is captured. In an embodiment, the predetermined policy can identify which portions of the endpoint's disk contents should be captured and which portions should be excluded from the maximal set. In various embodiments, the manifest of the maximal set identifies the contents of the maximal set, e.g. by providing identifying information for components in the maximal set.

In operation 411, the minimal set and the manifest are downloaded to a plurality of endpoints to deliver the application to the plurality of endpoints. For example, the minimal set can be downloaded to each endpoint when the application is assigned to the endpoint, e.g., by an administrator. Hence, the application may be assigned to the endpoints over time and the minimal set can be downloaded to each endpoint as the application is assigned. In various embodiments, each of the plurality of endpoints has an agent operating on the endpoint that performs the download of the minimal set.

In operation 413, requests from the endpoints for missing application components are tracked. Namely, when the application is launched from the minimal set on each endpoint (e.g., by a user of the endpoint opening the application), if an application component that is available in the maximal set is missing on the endpoint, then the server receives a request from the endpoint for the missing component. As described above, an agent operating on each endpoint can detect when the application requests a missing component, check the manifest to determine whether the component is available in the maximal set on the server, and send the request for the minimal set to the server for missing component. Such requests are tracked in operation 413. In various embodiments, the system can track each time a request is received from an endpoint for a particular application component.

In operation 415, a threshold amount of requests for a particular missing component is detected. Namely, as the system is tracking requests received from endpoints (operation 413), the system detects when the number of requests for a particular missing component exceeds a certain predetermined threshold. In an embodiment, the threshold amount may be a predetermined number. In this case, the system can detect, in operation 415, when the cumulative number of requests for the particular missing component exceeds the predetermined number. In another embodiment, the threshold may correspond to a proportion of endpoint devices that send a request for the particular component. For example, if the proportion is 3/100, then the system can detect, in operation 415, when the cumulative number of requests for the particular missing component from every 100 endpoints to which the minimal set was downloaded exceeds the number three. As will be apparent to those skilled in the art, in various embodiments, other ways not described herein may be implemented for determining when a threshold amount of requests for a particular missing component is detected. In various embodiments, the purpose of such a threshold may be to avoid adding unnecessary components to the minimal set; for example, when such components are requested in error or otherwise.

In operation 417, after the cumulative number of requests for the particular missing component has exceeded the threshold amount, the minimal set is amended by adding the particular missing component to the minimal set on the server. Hence, in subsequent deployments of the minimal set to an endpoint, the particular missing component will be included in the minimal set so that it does not have to be requests by and downloaded to the endpoint separately.

Figure 5:
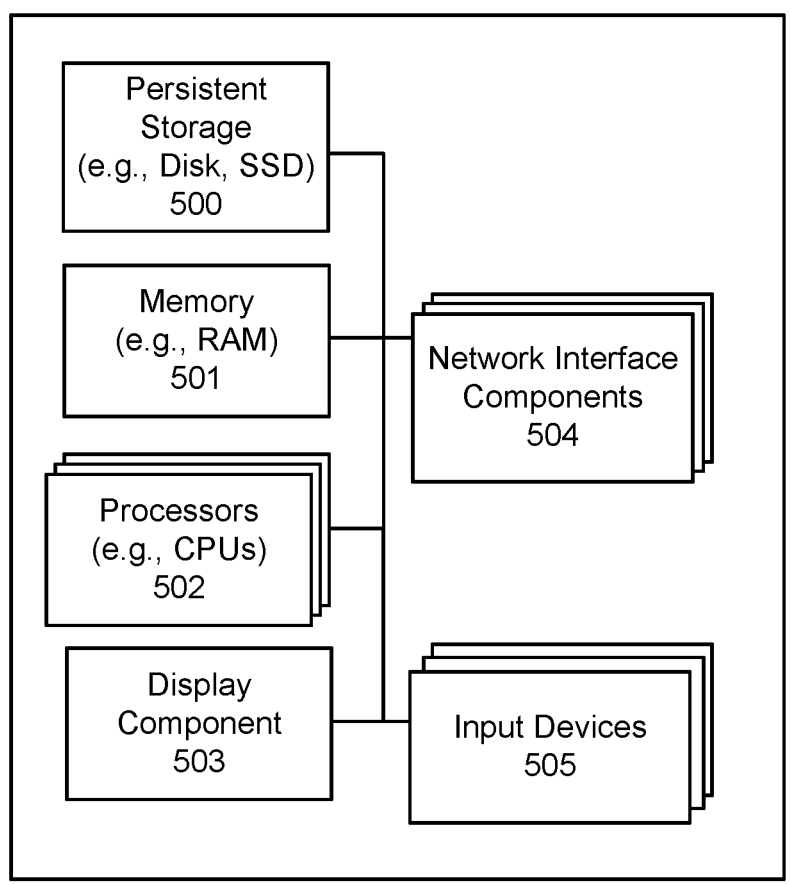
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with the other devices connected to the same or other network.

While various embodiments described herein illustrate the invention as being implemented via a server (e.g., 100) connected over a network (e.g., 112) to various endpoints (e.g., 110-1, 110-2, 110-N), the invention can be practiced in any other applicable architectures where the described techniques can be used to deploy an application on a computing device using a minimal set and a maximal set.

Various embodiments described herein can be implemented in a wide variety of environments, which in some cases can include one or more user computers, computing devices, or processing devices which can be used to operate any of a number of applications. User devices, endpoints, or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
transmitting, from a management server, a minimal set of application components stored on the management server to each client device in a plurality of client devices, the minimal set being deployable on each client device to install a corresponding application with sufficient functionality to launch the application, the minimal set missing at least a portion of the application components required by the application for full functionality;
installing the application on each client device in the plurality of client devices by deploying the minimal set;
executing the application from the deployed minimal set on each client device in the plurality of client devices;
during execution of the application from the deployed minimal set on the plurality of client devices, receiving at the management server, from one or more requesting client devices in the plurality of client devices, a request for a missing application component that was not included in the minimal set;
locating the missing application component in a maximal set, the maximal set comprising application components not available in the minimal set;
conveying the located missing application component in the maximal set to the requesting one or more client devices; and
in response to receiving at the management server a predetermined threshold number of requests for the missing application component from client devices executing the application from the minimal set, modifying the minimal set stored on the management server by adding the missing application component to the minimal set.

2. The method of claim 1, further comprising:
during execution of the application from the minimal set on the plurality of client devices, detecting, at the requesting client devices, an access by the application to the missing application component;
suspending execution of the application on the requesting client devices; and
sending the request for the missing application component from the requesting client devices to the management server.

3. The method of claim 1, wherein the maximal set is created by capturing disk content from a computing device on which the application is installed, according to a predefined policy.

4. The method of claim 3, wherein the predefined policy instructs at least one of: to capture all content on the computing device, or to capture all content on the computing device except content in predefined excluded areas that are deemed irrelevant to execution of the application.

5. The method of claim 1, further comprising:
conveying a manifest identifying components in the maximal set to the plurality of client devices.

6. The method of claim 5, further comprising:
determining, at the requesting client devices, whether the missing application component is available in the maximal set based on the manifest.

7. The method of claim 3, wherein the predefined policy instructs to capture content on the computing device in all memory locations deemed to be possible locations of application components.

8. A computing device, comprising:
at least one processor; and
memory including instructions that, when executed by the at least one processor, cause the computing device to perform the steps of:
transmitting, from a management server, a minimal set of application components stored on the management server to each client device in a plurality of client devices, the minimal set being deployable on each client device to install a corresponding application with sufficient functionality to launch the application, the minimal set missing at least a portion of the application components required by the application for full functionality;
installing the application on each client device in the plurality of client devices by deploying the minimal set;
executing the application from the deployed minimal set on each client device in the plurality of client devices;
during execution of the application from the deployed minimal set on the plurality of client devices, receiving at the management server, from one or more requesting client devices in the plurality of client devices, a request for a missing application component that was not included in the minimal set;
locating the missing application component in a maximal set, the maximal set comprising application components not available in the minimal set;
conveying the located missing application component in the maximal set to the requesting one or more client device; and
in response to receiving at the management server a predetermined threshold number of requests for the missing application component from client devices executing the application from the minimal set, modifying the minimal set stored on the management server by adding the missing application component to the minimal set.

9. The computing device of claim 8, wherein the memory further includes instructions that when executed by the at least one processor, cause the computing device to perform the steps of:
during execution of the application from the minimal set on the plurality of client devices, detecting, at the requesting client devices, an access by the application to the missing application component;
suspending execution of the application on the requesting client devices; and
sending the request for the missing application component from the requesting client devices to the management server.

10. The computing device of claim 8, wherein the maximal set is created by capturing disk content from a computing device on which the application is installed, according to a predefined policy.

11. The computing device of claim 10, wherein the predefined policy instructs at least one of: to capture all content on the computing device, or to capture all content on the computing device except content in predefined excluded areas that are deemed irrelevant to execution of the application.

12. The computing device of claim 8, wherein the memory further includes instructions that when executed by the at least one processor, cause the computing device to perform the steps of:
conveying a manifest identifying components in the maximal set to the plurality of client devices.

13. The computing device of claim 12, wherein the memory further includes instructions that when executed by the at least one processor, cause the computing device to perform the steps of:
determining, at the requesting client devices, whether the missing application component is available in the maximal set based on the manifest.

14. The computing device of claim 10, wherein the predefined policy instructs to capture content on the computing device in all memory locations deemed to be possible locations of application components.

15. A non-transitory computer readable storage medium comprising one or more sequences of instructions, the instructions when executed by one or more processors causing the one or more processors to execute the operations of:
transmitting, from a management server, a minimal set of application components stored on the management server to each client device in a plurality of client devices, the minimal set being deployable on each client device to install a corresponding application with sufficient functionality to launch the application, the minimal set missing at least a portion of the application components required by the application for full functionality;
installing the application on each client device in the plurality of client devices by deploying the minimal set;
executing the application from the deployed minimal set on each client device in the plurality of client devices;
during execution of the application from the deployed minimal set on the plurality of client devices, receiving at the management server, from one or more requesting client devices in the plurality of client devices, a request for a missing application component that was not included in the minimal set;
locating the missing application component in a maximal set, the maximal set comprising application components not available in the minimal set;
conveying the located missing application component in the maximal set to the requesting one or more client devices; and
in response to receiving at the management server a predetermined threshold number of request for the missing application component from client devices executing the application from the minimal set, modifying the minimal set stored on the management server by adding the missing application component to the minimal set.

16. The non-transitory computer readable storage medium of claim 15, further comprising instructions that when executed by the one or more processors cause the one or more processors to execute the operations of:

during execution of the application from the minimal set on the plurality of client devices, detecting, at the requesting client devices, an access by the application to the missing application component;

suspending execution of the application on the requesting client devices; and sending the request for the missing application component from the requesting client devices to the management server.

17. The non-transitory computer readable storage medium of claim 15, wherein the maximal set is created by capturing disk content from a computing device on which the application is installed, according to a predefined policy.

18. The non-transitory computer readable storage medium of claim 17, wherein the predefined policy instructs at least one of: to capture all content on the computing device, or to capture all content on the computing device except content in predefined excluded areas that are deemed irrelevant to execution of the application.

19. The non-transitory computer readable storage medium of claim 15, further comprising instructions that when executed by the one or more processors cause the one or more processors to execute the operations of:

conveying a manifest identifying components in the maximal set to the plurality of client devices; and determining, at the requesting client devices, whether the missing application component is available in the maximal set based on the manifest.

20. The non-transitory computer readable storage medium of claim 17, wherein the predefined policy instructs to capture content on the computing device in all memory locations deemed to be possible locations of application components.

\* \* \* \* \*